Aug. 15, 1961 L. S. ROARK 2,996,584
ELECTRIC CABLE REEL
Filed June 5, 1956 3 Sheets-Sheet 1

Leon S. Roark
INVENTOR.

BY *Clarence A. O'Brien*
*and Harvey B. Jacobson*
Attorneys

Aug. 15, 1961
L. S. ROARK
2,996,584
ELECTRIC CABLE REEL
Filed June 5, 1956
3 Sheets—Sheet 2
Fig. 2
Fig. 6
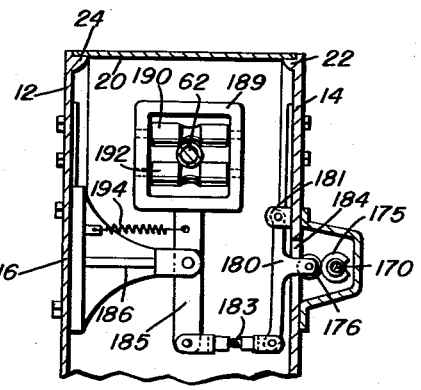
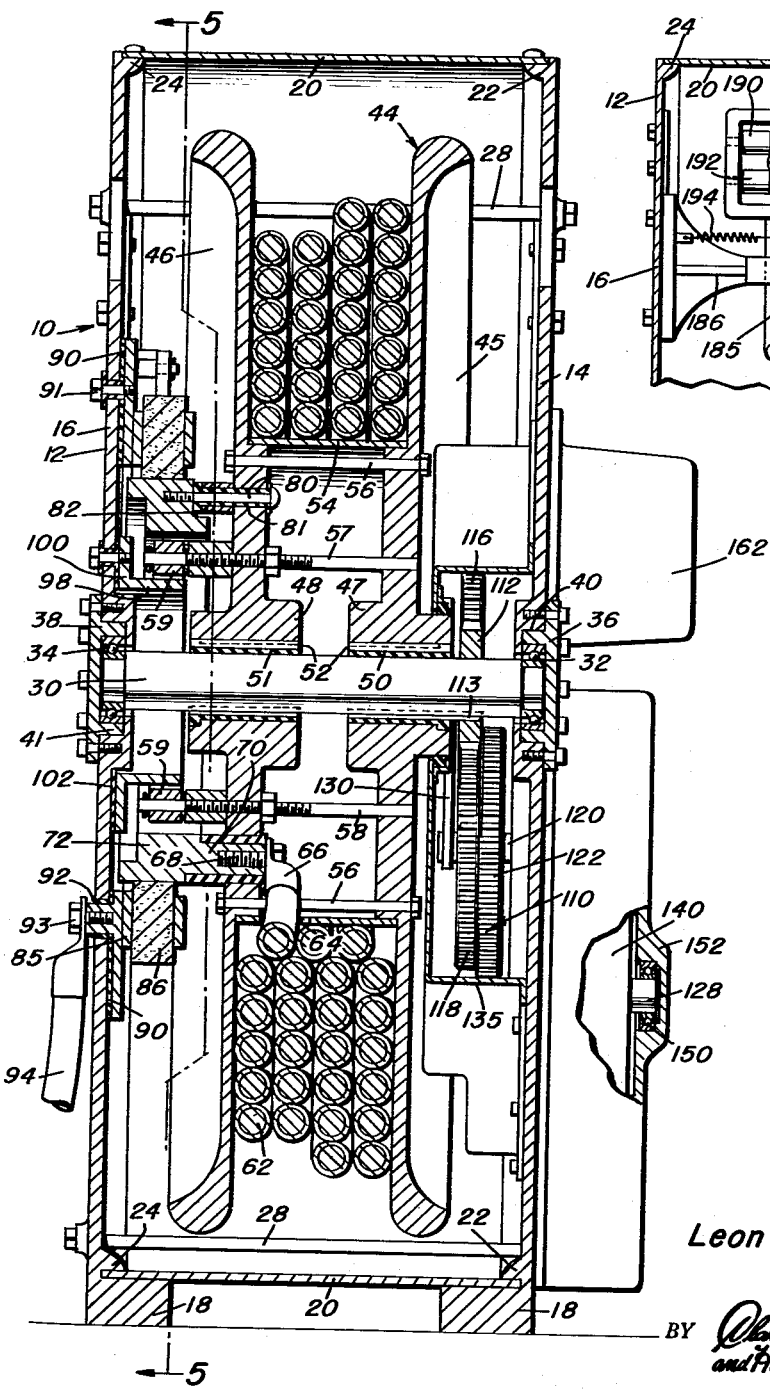
Leon S. Roark
INVENTOR.
BY *Clarence A. O'Brien*
*and Harvey B. Jacobson*
Attorneys Leon S. Roark
INVENTOR.

United States Patent Office 2,996,584
Patented Aug. 15, 1961

2,996,584
ELECTRIC CABLE REEL
Leon S. Roark, El Dorado, Ark., assignor to United Specialties, Inc., El Dorado, Ark., a corporation of Arkansas
Filed June 5, 1956, Ser. No. 589,425
2 Claims. (Cl. 191—12.2)

This invention relates to a device for storing cable and particularly to a device for automatically retrieving electric arc welding cable and retaining it in an orderly fashion after it has been used.

The general object of the invention is to provide a device for more properly and effectively handling and storing cable, particularly cable that is used for electric arc welding. The invention provides a ready storage for this type of cable and eliminates the use of excessive cable by providing only the actual length of cable that is necessary to do a particular welding job.

Another object of the invention is to provide a device which will inherently assure greater safety to welders or other workers by eliminating tangled cable on the floor over which workers tend to trip. Another source of potential accident which is avoided by the invention is that brought about by worn insulator on the cable. Occasionally a defective part of the insulator on the cable comes into contact with a ground and causes difficulty.

A further object of the invention is to provide a device which facilitates the worker in having a neat and orderly workshop or site on a particular job. This is accomplished by having the cable very easily withdrawn into a neat housing after the welder has finished his job.

A more specific object of the invention is to provide a cable reel take-up device that is in a neat housing, the takeup device featuring a very rugged and durable electrical system having a slip ring and one or more brushes and in the same compact, portable unit a spring motor for rewinding the reel to draw the cable into the housing after it is used together with a highly simple locking device that holds the reel in such position that the desired length of cable is extended from the housing and finally, a level winding device to make certain that the windings of cable on the reel are neat and orderly at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken on the line 2—2 of FIGURE 1 and in enlarged scale;

FIGURE 6 is a fragmentary sectional view taken on the line 6—6 of FIGURE 4 showing principally the device for assuring that the windings of cable on the drum are orderly at all times.

Figure 1:
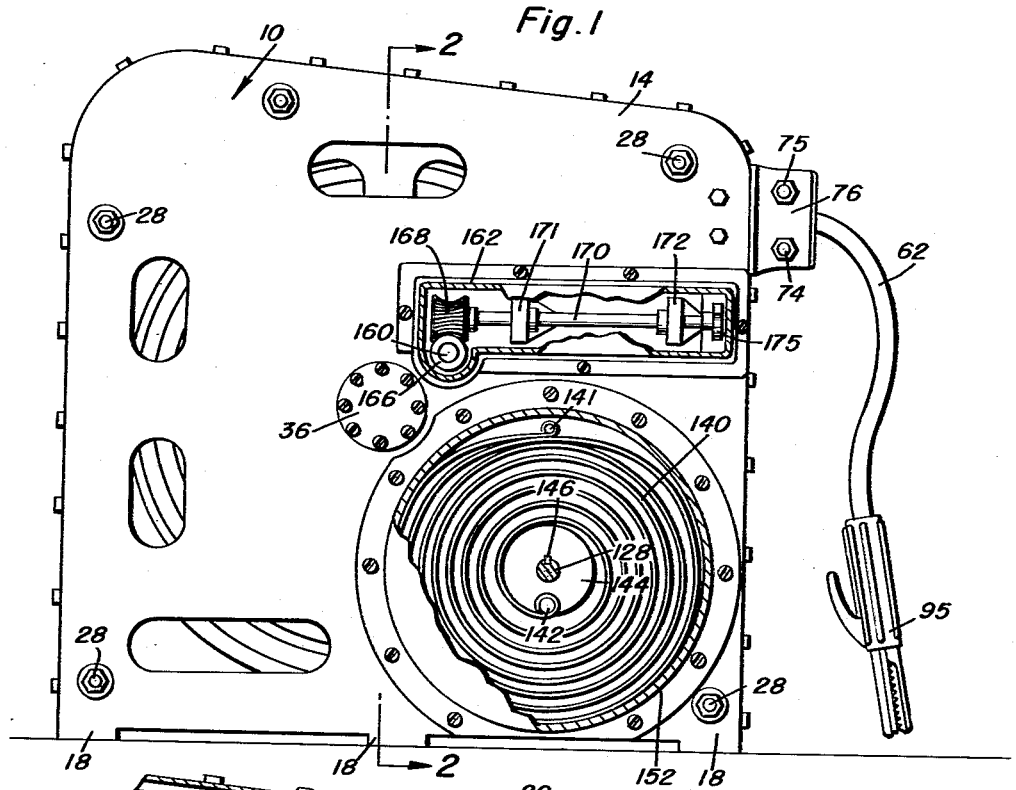
FIGURE 1 is an elevational side view of a device that has been constructed in accordance with the principles of the invention, parts being broken away to illustrate internal detail.

The device 10 that is constructed in accordance with the invention is portable so as to be easily moved from one job to another or from one place in a room to another depending on the desires of the welder. It is intended to be used with other equipment, as the welder unit, and functions as a device for automatically taking up and storing the cable after the welder is finished with it. Therefore the unit is made compact and portable, consisting of a housing 12 that has side walls 14 and 16 whose lower extremities are formed with feet 18. A plate 20 is seated on flanges 22 and 24 around the edge of the side walls 14 and 16 and is held in place by being bolted or by the use of other standard fasteners. Through bolts 28 are passed through apertures in the side walls 14 and 16 in order to hold the housing assembled.

Figure 5:
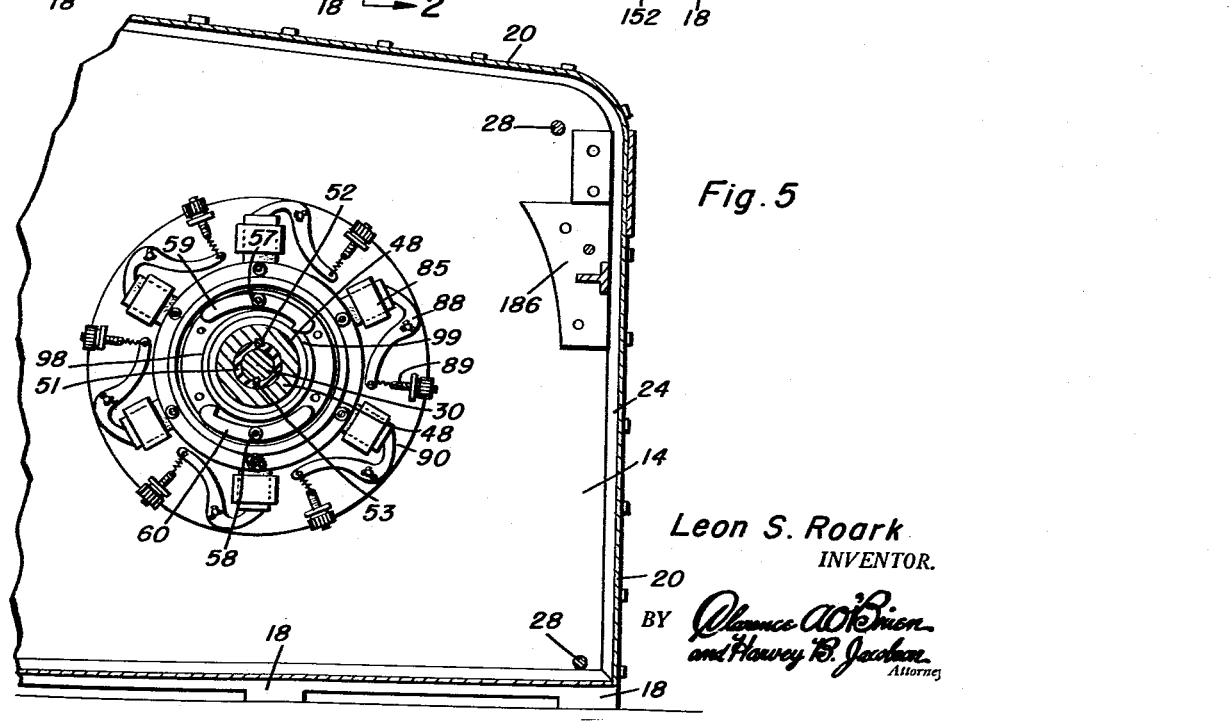
FIGURE 5 is a fragmentary sectional view taken approximately on the line 5—5 of FIGURE 2.

Shaft 30 has its reduced ends mounted for rotation in anti-friction bearings 32 and 34 that are supported by bearing flanges 36 and 38 in openings 40 and 41 formed in the side walls 14 and 16 of the housing 12. The flanges 36 and 38 may be bolted or otherwise fastened, depending upon the method of assembly which is selected. This construction permits shaft 30 to be rotated freely insofar as the housing is concerned. Reel 44 of special construction is fixed to the shaft 30 so that it must rotate with the latter. The reel is made of two plates 45 and 46, each having a hub as at 47 and 48 that are fixed to insulating sleeves 50 and 51 on shaft 30. The hubs of the plate (FIGURE 5) are fixed to shaft 30 in this way: Keys 52 secure the hubs 48 and 47 to the insulating sleeves 50 and 51, while keys 53 secure the insulating sleeves 50 and 51 to the shaft 30. This forms a unified construction whereby rotation of the shaft 30 causes a corresponding rotation of the reel 44. The opposite is also true, that is, rotation of reel 44 causes a corresponding rotation of shaft 30. A circular band 54 is on shoulders between the plates 45 and 46 and forms the hub of the reel 44. Bolts 56 are attached between and to the plates 45 and 46 holding the reel assembled. Two of the bolts 57 and 58 are elongated to provide means for mounting the pawls 59 and 60 (FIGURE 5) for rocking movement. These pawls coact with other structure in order to form a locking device for the reel 44.

Cable 62 is of standard form and is wound on the reel 44. One end of the cable is passed through a hole 64 in reel hub 54 so that the clip 66 at one extremity of the cable may be connected, as by bolts 68 to a lug 70 on slip ring 72. The opposite end of cable 62 is passed through opening 71 in plate 20 and is guided by upper and lower rollers 73 mounted for rotation on spindles 74 and 75 in support brackets 76 and 77 on the front of housing 12.

Slip ring 72 is circular and is located in housing 12. It is held fastened in place onto plate 46 of reel 44 by means of a series of bolts 80 which are passed through openings in plate 46 but are insulated from the plate by means of sleeves or grommets 81. A ring 82 of insulating material is disposed on the outer surface of plate 46 and on the inner surface of the slip ring assuring that the reel does not enter into the circuit with conductor 62. A series of brush holders 85 are secured to the side 16 of housing 12 and each accommodates a brush, for example, brush 86 in brush holder 85 of FIGURE 2. A spring biased rocker arm 88 applies a resilient force on the brush 86, keeping it pressed firmly against the outer surface of the slip ring 72 with which it coacts. The spring tension for the rocker 88 is adjusted by screw 89 which are threaded through flanges on brush holder ring 85. Electrical insulator 90 is disposed between the brush holder ring 85 and the side 16 of housing 12, parts of this insulation passing through the holes through which the bolts 91 pass, thereby insulating brush holder ring 84 and bolts 91 from side wall 16 of housing 12. The brush holder ring 85 to be energized through a hollow threaded stud 92 which is formed on and a part of brush holder ring 85, passing through a hole in said wall 16 of housing 12 and insulated therefrom by means of insulator to thereby establish a terminal for the device. A feeder cable 94 from the welder apparatus is attached to the terminal in order to apply electrical energy to the brush holder ring with which it is operatively connected, through the brushes, and to the slip ring, and finally to the cable 62 whose outer end is fitted with a conventional welding rod holding clamp 95.

As the cable 62 is paid out of the opening 71, for example by the welder pulling on the cable 62, reel 44 rotates causing bolts 57 and 58 to rotate with it. Pawls 59 and 60 ride over drum 98 without engaging in the slot 99 that is formed in it due to the curvature of the ends of the pawls. Drum 98 has a mounting flange 100 that is bolted or otherwise fixed on the inner surface of sidewall 16 and is insulated therefrom by insulating material 102 between flange 100 and the surface of side wall 16. When reel 44 is rotated in the opposite direction, that is, the direction for withdrawing the cable 62 into the housing 12, the teeth on the pawls 59 and 60 engage in slot 99, and since drum 98 is fixed, the reel 44 is stopped. However, should the reel 44 be allowed to rotate at a sufficient high rate of speed to develop a centrifugal force, the pawls 59 and 60, each formed with a slot forming a tooth in the heavier end, will align themselves whereby the teeth on the pawls will clear the slot 99 in the drum 98. In order to move the cable into housing 12 only partway, the welder holds the cable in his hand withdraws it from the housing slightly (enough to disengage the teeth of the pawls 59 or 60 from slot 99) and then permits the cable 62 to be withdrawn rapidly into the housing 12 the distance that the welder desires. Then he stops the reel 44 by holding onto the cable 62 and lets the cable return (in a corresponding rotation of drum 44) slowly to permit one of the pawls 59 or 60 to have its tooth fall into the slot 99. This temporarily locks the reel 44 as described herein.

A transmission 110, for example a gear train, is operatively connected with shaft 30, gear 112 of the gear train is keyed as at 113 to the shaft 30 and is enmeshed with level winding gear 116 and idler gear 118. Idler gear 118 is fixed to idler gear shaft 120, as is gear 122, the latter being enmeshed with spring shaft gear 126 that is keyed or otherwise fixed to spring shaft 128. Mounting bracket 130 is fixed to bracket 132, as by spot welding, and bolts 133 mount the bracket 132 on the inside surface of housing side wall 14. Gear case 135 is also mounted in the housing and on side wall 14 thereof.

Figure 3:
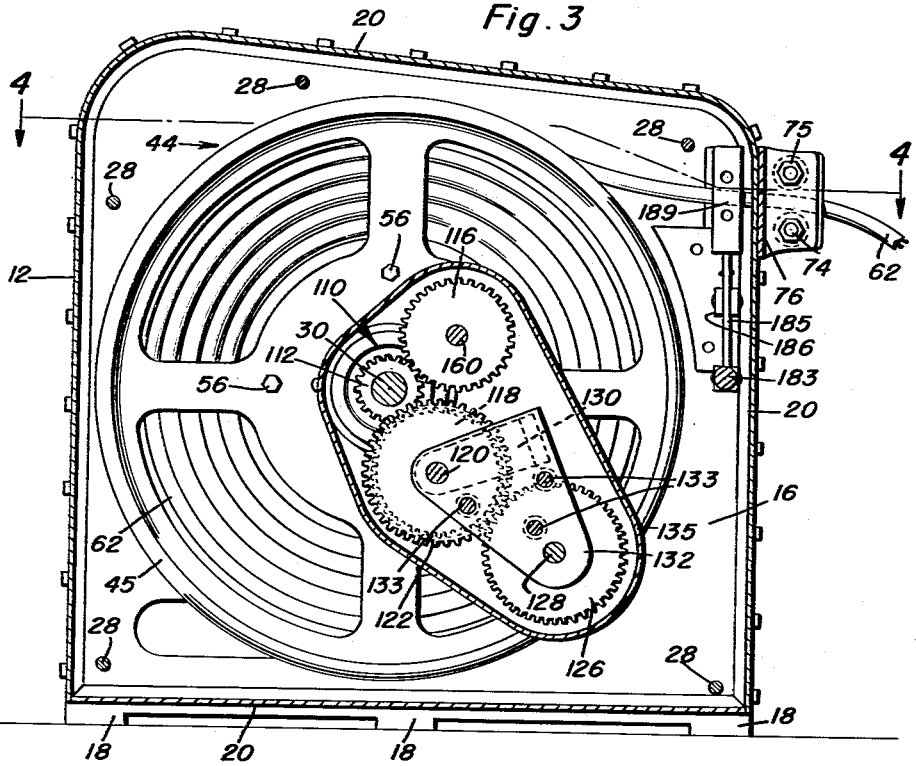
FIGURE 3 is a longitudinal sectional view of the device in FIGURE 1.
Figure 4:
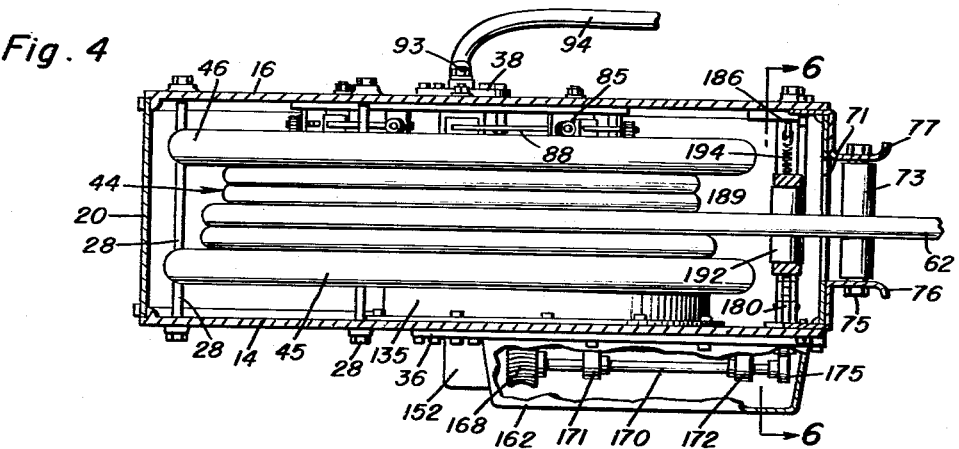
FIGURE 4 is a sectional view taken approximately on the line 4—4 of FIGURE 3.

A spring motor is provided for the purpose of rewinding the reel 44 that is, rotating it in a direction to withdraw the cable 62 into the housing. This motor consists of a spring of the flat type which has its ends anchored respectively to a pin 141 on housing side wall 14 and to a pin 142 fixed on hub 144. The latter is keyed, as at 146 to the spring shaft 128. The outer extremity of spring shaft 128 is mounted in an anti-friction bearing 150 in cover 152 for the spring motor. The latter is connected by fasteners to a side wall of the housing 12 and encases the spring 140. Therefore as the cable 62 is pulled from housing 12 and the reel causes a rotation of shaft 30, the transmission 110 winds spring 140 through the gearing (FIGURE 3) and shaft 128. The pawls of the locking device when fixing shaft 30 temporarily holds spring 140 under a load so that when the pawls are released and the cable 62 permitted to return in housing 12, the stored energy in spring 140 causes reel 44 to rotate to the gear train of the transmission and shaft 30.

The gear 116 of transmission 110 is fixed to shaft 160 that passes through an opening in housing side wall 14. The part of the shaft 160 that is passed through side wall 14 is disposed in a case 162 that is bolted or otherwise fastened onto the outer surface of side wall 14 of housing 12. Worm 166 is fixed to shaft 160 and is enmeshed with a worm wheel 168, the latter being keyed or otherwise secured to shaft 170. This shaft is mounted for rotation in bearings 171 and 172 which are fixed on the outer surface of the side wall 14 of housing 12 and which are located in case 162. Cam 175 is on the outer extremity of shaft 170 and is in contact with a cam follower 176 (FIGURE 6).

The cam follower provides the motivating force for a mechanism which automatically maintains the windings of the cable 62 on the reel in an orderly fashion. The remainder of the structure for functioning in this way can be seen best in FIGURE 6 and includes a rocker 180 whose end is mounted for oscillation on bracket 181 that is fixed to the housing side wall 14. The opposite end of rocker arm 180 has an adjustable link 183 connected to it while the intermediate part of rocker 180 supports the cam follower 176 that protrudes through an opening 184 in side wall 14. Adjustable link 183 is pivoted to a lever 185 whose intermediate part is pivoted on support 186 that is carried by side wall 16 of housing 12. The opposite end of lever 185 supports a frame 189 that has a pair of grooved rollers 190 and 192 respectively arranged parallel to each other to form a passageway within which to accommodate the cable 62. Spring 194 is anchored at one end to the interior of the housing and at the other end to the lever 185. By virtue of the linkage and lever arrangement, frame 189 is oscillated back and forth behind guide rollers 73 in timed relationship to the rotation of reel 44 through the intermediate structure of the transmission 110.

In practical use the terminal established by bolt 93 (FIGURE 2) is connected with the welder apparatus, as by feeder 62. A welding rod is applied in the welding rod holder 95 in the customary manner. Then the workman has his apparatus ready for use. By pulling on the welding rod holder 95, cable 62 is paid from the device 10, causing reel 44 to rotate as described previously and at the same time causing the spring 140 to be wound. When a desired length of cable is pulled from the device 10, the locking pawls 59 and 60 automatically hold onto the drum 98 retaining the reel 44 in the selected position with the desired length of cable 62 pulled therefrom.

After the welding operation or operations are complete the workman merely tugs slightly on the cable 62 in order to release the pawls 59 and 60 and then releases the cable 62. The centrifugal force on the pawls keep them separated from their locking slot 99 allowing spring 140 to forcibly wind the reel 44 in such direction as to return the cable 62.

While the cable is being returned into housing 12 the level winding apparatus automatically operates with frame 189 oscillating back and forth to spread the windings of the cable 62 evenly on the reel 44 as disclosed in FIGURE 2.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An electric cable winding and storing device for electric arc welding comprising, a cable, a reel on which said cable is wound, a housing in which said reel is rotatively mounted, insulated electric feeder means operatively connected to said housing and reel for anchoring one end of the cable on the reel and supplying electric current thereto, one-way stop means mounted on said housing and operative to engage and stop rotation of said reel in a rewind direction and being releasable in response to rewind rotational speed of said reel, energy storing spring motor means mounted on said housing, positive gear means drivingly connecting said spring motor means to said reel at a first overdrive gear ratio for rapid rotation of the reel in a rewind direction so as to insure speed responsive release of said one-way stop means and rapid rewind of the cable, said gear means drivingly connecting said spring motor means to a cable leveling means at a second gear ratio lower than said first gear ratio for slow reciprocation thereof, said leveling means being mounted on said housing and operatively engaged with said cable for guiding it as it is reeled in and out of the housing, said housing including a side wall on which said feeder means and stop means are mounted, an opposite side wall on which said gear means and spring motor means are mounted and a front wall connected to said side walls and mounting cable guide means disposed adjacent to and forwardly of said leveling means, said spring motor means being mounted entirely within a casing removably mounted on an external surface of said opposite wall.

2. The device as defined in claim 1 wherein said gear means is mounted entirely within a gear casing secured to said opposite wall.

References Cited in the file of this patent

UNITED STATES PATENTS

| | | |
|---|---|---|
| 1,411,206 | Dorion | Mar. 28, 1922 |
| 1,552,095 | Tilton | Sept. 1, 1925 |
| 1,565,705 | Boner | Dec. 15, 1925 |
| 1,747,411 | Anderson | Feb. 18, 1930 |
| 2,133,551 | Logan | Oct. 18, 1938 |
| 2,453,407 | Burns | Nov. 9, 1948 |
| 2,483,760 | Duncan | Oct. 4, 1949 |
| 2,487,395 | Strong | Nov. 8, 1949 |
| 2,612,569 | Moon | Sept. 30, 1952 |
| 2,708,977 | Scheppe | May 24, 1955 |
| 2,726,971 | O'Grady | Dec. 13, 1955 |